United States Patent
Schneider et al.

(10) Patent No.: US 9,182,824 B2
(45) Date of Patent: Nov. 10, 2015

(54) ACTUATING DEVICE HAVING A TOUCH-SENSITIVE SURFACE WHICH CAN BE MANUALLY OPERATED

(71) Applicant: AUDI AG, Ingolstadt (DE)

(72) Inventors: Johann Schneider, Wettstetten (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/361,832

(22) PCT Filed: Nov. 2, 2012

(86) PCT No.: PCT/EP2012/004584
§ 371 (c)(1),
(2) Date: May 30, 2014

(87) PCT Pub. No.: WO2013/079145
PCT Pub. Date: Jun. 6, 2013

(65) Prior Publication Data
US 2014/0327653 A1   Nov. 6, 2014

(30) Foreign Application Priority Data
Nov. 30, 2011   (DE) .......................... 10 2011 119 746

(51) Int. Cl.
| G06F 3/041 | (2006.01) |
|---|---|
| G06F 3/01 | (2006.01) |
| G06F 3/044 | (2006.01) |
| G06F 3/045 | (2006.01) |
| G06F 1/16 | (2006.01) |

(52) U.S. Cl.
CPC ............... *G06F 3/016* (2013.01); *G06F 1/169* (2013.01); *G06F 3/044* (2013.01); *G06F 3/045* (2013.01); *G06F 3/0414* (2013.01); *G06F 3/0416* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| 6,657,614 | B1 * | 12/2003 | Ito et al. ......................... 345/168 |
|---|---|---|---|
| 2002/0175836 | A1 * | 11/2002 | Roberts ............................ 341/34 |
| 2006/0119586 | A1 | 6/2006 | Grant et al. |
| 2006/0284858 | A1 * | 12/2006 | Rekimoto ..................... 345/173 |

(Continued)

FOREIGN PATENT DOCUMENTS

| DE | 102011119746.3 | 11/2011 |
|---|---|---|
| EP | 2261781 | 12/2010 |
| EP | 2290510 | 3/2011 |
| EP | PCT/EP2012/004584 | 11/2012 |

OTHER PUBLICATIONS

German Office Action for German Priority Patent Application No. 10 2011 119 746.3, issued Jul. 3, 2012, 5 pages.

(Continued)

*Primary Examiner* — Gerald Johnson
*Assistant Examiner* — Christopher Kohlman
(74) *Attorney, Agent, or Firm* — Staas & Halsey LLP

(57) ABSTRACT

An operating apparatus has a manually operable touch-sensitive surface with an associated actuator system for providing a haptic feedback signal on the basis of a touch, which represents triggering operation, on the surface. The actuator system can be used to provide a haptic feedback signal upon release of the pressure on the surface. The feedback signal is provided on the basis of a sensed change in the contact area of the finger pushing the surface.

11 Claims, 1 Drawing Sheet

(56) References Cited

U.S. PATENT DOCUMENTS

| | | | |
|---|---|---|---|
| 2010/0044121 A1* | 2/2010 | Simon et al. | 178/18.03 |
| 2010/0057235 A1 | 3/2010 | Wang et al. | |
| 2011/0050619 A1* | 3/2011 | Griffin | 345/174 |
| 2011/0074702 A1* | 3/2011 | Pertuit et al. | 345/173 |
| 2011/0141047 A1* | 6/2011 | Iwaizumi et al. | 345/173 |
| 2011/0227872 A1* | 9/2011 | Huska et al. | 345/174 |
| 2011/0289402 A1* | 11/2011 | Hiitola et al. | 715/234 |
| 2013/0088434 A1* | 4/2013 | Masuda et al. | 345/173 |
| 2013/0088438 A1* | 4/2013 | Shih et al. | 345/173 |

OTHER PUBLICATIONS

WIPO English Language Translation of the International Preliminary Report on Patentability for PCT/EP2012/004584, Downloaded from WIPO Website May 30, 2014, 6 pages.

English Language Translation of International Search Report for PCT/EP2012/004584, mailed Feb. 11, 2013, 3 pages.

WIPO English language translation of International Preliminary Report on Patentability mailed on Jun. 12, 2014 for corresponding International Patent Application No. PCT/EP2012/004584.

* cited by examiner

ACTUATING DEVICE HAVING A TOUCH-SENSITIVE SURFACE WHICH CAN BE MANUALLY OPERATED

CROSS REFERENCE TO RELATED APPLICATIONS

This application is based on and hereby claims priority to International Application No. PCT/EP2012/004584 filed on Nov. 2, 2012 and German Application No. 10 2011 119 746.3 filed on Nov. 30, 2011, the contents of which are hereby incorporated by reference.

BACKGROUND

The invention relates to an operating apparatus having a manually operable touch-sensitive surface with an associated actuator system for providing a haptic feedback signal on the basis of a touch.

Such operating apparatuses having a touch-sensitive surface are used in many different ways in the form of what are known as touchscreens or touchpads. They can be used wherever the surface is intended to be used to input control commands and the like, for example on control panels or monitors, but also on portable equipment such as mobile telephones, tablet PCs, laptops and the like.

Such operating apparatuses are a combined input and output appliance in which the operation or program execution of an appliance, as indicated above, can be controlled directly by touching particular surface regions defined by a displayed image. In this case, control is usually effected using the finger, but it is also possible for it to be carried out using a stylus.

Usually, a touch-sensitive surface of this kind or a touchscreen of this kind comprises three elements. Firstly, the touch sensor, in addition an associated controller and also a software driver. Downstream of the touch sensor there may be a screen on which the image defining the sensitive input regions is displayed, said image being visible through the two-dimensional touch sensor, that is to say the actual touch-sensitive surface. The touch sensor itself usually has a touch-sensitive layer, comprising optical glass or a flexible polyester layer. In order to sense a signal-generating touch, a current usually flows through or via this surface, and this, in the event of touch with the finger or the like, brings about a voltage change or a signal swing that is sensed and evaluated in order to ascertain the touched position and hence in order to capture an input command. The controller is used to sense such user inputs on the touch sensor, that is to say ultimately the touch-sensitive surface, and to forward them as signals, which signals are processed by the software that is installed on the appliance in order to interpret the touch-related signals delivered by the controller.

The design of the touchscreen or touchpad, that is to say the touch-sensitive surface itself, may differ depending on the underlying technology. By way of example, resistive touch surfaces are known, comprising an outer plastic film layer and an inner glass or plastic pane, which are separated by spacers. The areas associated with one another are coated with an indium tin oxide layer (ITO layer). ITO is a translucent semiconductor. A low test voltage that is used for actuation is applied to one or both ITO layers. When the outside layer is now pushed locally, the result is local electrical contact between the ITO layers, and an electrical resistance is produced, the effect of which on the voltage ratio of the voltage tapped off allows ascertainment of the touch point relative to the respective margin of the layer. The basic design of a resistive touchscreen of this kind is known.

A further basic design is that of a capacitive touch surface. This comprises a glass substrate coated with a transparent metal oxide, usually again an ITO layer. The corners of the sensor are provided with electrodes to which a test or operating voltage is applied that is used to produce a uniform electrical field. The surface is statically charged by the latter. A touch with a capacitive medium, which is what a finger is, triggers charge transfer. Capacitively bound charge transfers to the finger, and there is a flow of current that is measured at the corners of the touchscreen. There is therefore a disturbance in the electrical field, and the flow of current is in direct proportion to the position of the touch. The associated controller again senses the relevant signals, and the software evaluates them.

A third basic design that is known is also optical touch surfaces. These comprise a matrix comprising light-emitting diodes and photodetectors. The light-emitting diodes shine on the detectors on the opposite side. A touch on the surface interrupts the beam of light and hence caters for a measurable signal drop that can readily be resolved locally. That is to say that the controller locates the touch point. This basic touchscreen design is also sufficiently well known.

In addition, touch surfaces are known that provide the user with a haptic (tactile) feedback signal when he has successfully made a signal input and he releases the pressure on the surface. This haptic or tactile feedback signal serves to perceptively signal the successful signal or command input to the user. To this end, a suitable actuator system is provided. Inertial actuators are known for this, usually comprising a motor that turns an eccentrically mounted mass, or comprising a spring/mass system that is capable of oscillation.

Alternatively, piezoelectric actuators are known, which can be produced in a very thin design with a very fast reaction time. The use of a piezoelectric actuator of this kind, which may also be of pane-like design, for example, involves the touch surface either being bent or being pushed against another area, so that a displacement movement is produced.

Such an actuator system can thus be used to set the touchscreen or the touchpad, that is to say the touch-sensitive surface, in motion such that there is a haptically perceived "click" for the user upon the exertion of pressure on the surface. It is then possible both for pushing the surface and for releasing the pressure on the surface each to produce a separate actuator-like movement. To emulate the mechanical click as realistically as possible in this case, it is necessary to allow the actuator system to be triggered as promptly as possible. Whereas the "push" click can be recognized in relatively delay-free fashion by compressive force sensors situated under the touchscreen or touchpad, the "release" click, that is to say the removal of the finger from the surface, can involve delays on account of the sluggish system mass, as a result of which an imprecise click sensation is produced.

SUMMARY

One possible object is to specify an operating apparatus that allows more precise provision of a feedback signal upon release of the pressure on the surface, that is to say the "release" click.

The inventors propose an operating apparatus of the type cited at the outset to involve the feedback signal being provided on the basis of a sensed change in the contact area of the finger pushing the surface.

Unlike in the related art to date, where the "release" click feedback signal is provided on the basis of a sensed pressure change, the proposals involves the feedback signaling being based on a change in the contact area of the finger of the the surfaces. The user uses the finger to push the surface, which results in the command input. The minimum pressure that can be produced therefore results in a corresponding contact area for the finger on the surface, that is to say that the contact area of the finger increases as pressure is exerted on the area. When the pressure is now reduced, there is inevitably a reduction in area, since the soft finger is no longer pushed so as to widen as much at lower pressure as at higher pressure. Therefore, a relative reduction in area or relative alteration in area is produced. According to the proposal, a suitable sensing device is now used to detect this alteration in the contact area. If an alteration in area that corresponds at least to a defined degree of change is sensed, this is regarded as a triggering constraint for the provision of the tactile feedback signal, which can then be provided immediately. That is to say that as soon as the system recognizes a change in the finger contact area within the framework of the prescribed parameters, the "release" click, that is to say the "release" feedback signal, is triggered and hence occurs even before triggering by the compressive force sensors, which should preferably additionally sense the "release" case as a redundant sensing release on account of their 100% recognition certainty. A particular advantage of the control according to the proposal over the related art is furthermore that the precise contact area for the fixed trigger force that is required for command input is known, that is to say that as soon as the actual input command provided by the touch is sensed, that is to say when sufficient pressure is provided, the contact area is actually immediately sensed at this time, on the basis of which it is possible to interpret a change occurring in the defined measure as release of the finger. Since, furthermore, the relative alteration in the contact area is ascertained, the size of the finger is consequently insignificant for triggering of the feedback signal.

According to a first embodiment, the touch-sensitive surface may contain a capacitive touch sensor. This capacitive touch sensor affords the opportunity to sense the finger contact area and the change therein. As described, the touch sensor has an associated appropriate controller along with associated software. The software is then designed such that the touch-dependent signals provided by the controller can be used to sense the contact area and consequently also to sense a corresponding area alteration.

In the case of a capacitive touch sensor, a touch results in a measurable current, with the measured current being dependent on the touch area, and thus the finger contact area. Applying the finger results in a change in the capacitance of the capacitor formed, with the capacitance changing on the basis of the contact area. Appropriate evaluation of the measurement signals provided therefore allows the alteration in the contact area to be determined from the "current balance".

In an alternative embodiment, the touch-sensitive surface is produced by a resistive touch sensor. In this case, pushing the surface results in electrical contact between the mutually opposite layers, and an electrical resistance is produced that affects the voltage ratio. In this case too, however, the measured voltage is ultimately dependent on the size of the contact area over which the two layers touch, and hence on the finger contact area, since the electrical resistance is ultimately area-dependent. In this case, too, the relevant evaluation software can therefore be used to effect appropriate area sensing or area change sensing using the measurement signals provided.

In addition, the inventors propose a method for operating an operating apparatus having a manually operable touch-sensitive surface with an associated actuator system for providing a haptic feedback signal on the basis of a touch, which represents triggering operation, on the surface, wherein the actuator system is used to provide a haptic feedback signal upon release of the pressure on the surface. The method is distinguished in that a sensing device senses the contact area of the finger pushing the surface and ascertainment of a defined change in the contact area prompts the provision of the feedback signal to be triggered.

As already explained above, the sensing device is ultimately the touch-sensitive surface itself, which is produced by an appropriate touch sensor, in conjunction with an appropriately designed piece of signal processing software that evaluates the provided measurement signals in respect of area dependency. That is to say that the finger contact area or the change therein is ultimately ascertained indirectly by the evaluation of the measurement signals provided.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
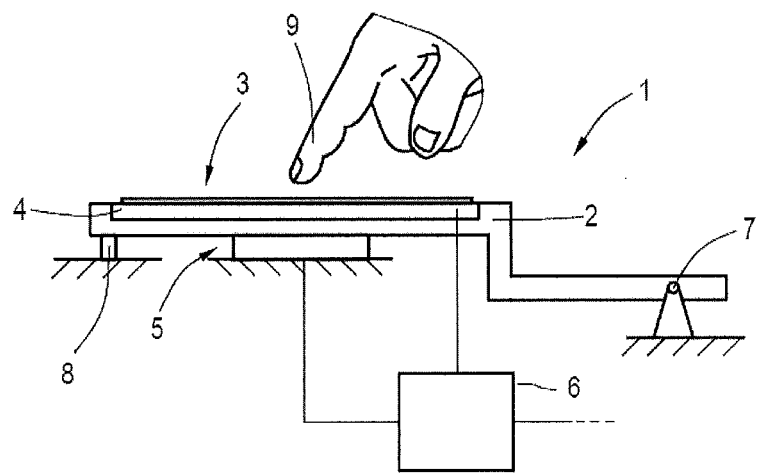
FIG. 1 shows a side view of an operating apparatus according to the inventors' proposals in the form of a basic illustration.

Reference will now be made in detail to the preferred embodiments of the present invention, examples of which are illustrated in the accompanying drawings, wherein like reference numerals refer to like elements throughout.

FIG. 1 shows, in the form of a basic illustration, an operating apparatus 1, comprising a support 2 on which a touch-sensitive surface 3, that is to say a touchscreen or touchpad, is provided. The touch-sensitive surface may have an associated display device 4, for example an LCD screen that can be used to display image representations that are visible through the touch-sensitive surface 3 and that are able to be used to define appropriate area regions that can serve as input panels. Alternatively, the relevant graphical surface can be presented on a separate screen, e.g. in the instrument panel.

Provided below the support 2 is an actuator system 5, for example a vibration device based on an electromagnet, a plurality of piezoactuators or an eccentric motor. This actuator system can be used to apply a haptic feedback signal to the support 2, that is to say a vibration signal that the operator feels via the touch-sensitive surface 3 when he pushes the latter. In any case, this feedback signal is provided when the operator, having provided an input signal by pushing the surface, releases the finger again (release signal), but it may also be provided when the operator has successfully provided the input signal (push signal).

In addition, a control device 6 that controls the entire operation of the operating apparatus is provided. The control device 6 is connected to downstream electronics (not shown) in order to transmit or receive appropriate control commands. The control device 6 comprises a controller—not shown in more detail—along with appropriate processing software, which is used, particularly in the case, not only to evaluate the actual signal delivered by the controller and tapped off at the touch-sensitive surface 3 in terms of the input command but also to ascertain the size of the contact area of the finger on the touch-sensitive surface and how the area alters over time. The reason is that the proposals involve a corresponding alteration in the contact area over time being used as a triggering constraint for the provision of a haptic feedback signal via the actuator system 5.

By way of example, the touch-sensitive surface 3, that is to say the touchscreen or touchpad, is a capacitive touch sensor. It comprises a glass area that is coated with a low-thickness transparent ITO layer. The corners of the layer are provided with electrodes to which a voltage is applied that is used to produce a uniform electrical field and consequently to statically charge the surface. If the surface is then touched with the finger, which is a capacitive medium, charge flows from the surface to the finger, and there is resultant charge transfer, and hence a flow of current that can be measured by the corner sensors. The touch sensor thus forms a capacitor structure that is discharged locally by the finger. The resultant disturbance in the electrical field can be resolved locally by the corner sensors, that is to say that the controller in conjunction with the downstream software in the control device 6 can thus be used to sense where over the entire area of the surface 3 that touch took place. The basic design of a capacitive touch sensor of this kind (and naturally also appropriate modifications that all involve the capacitive operating principle) are sufficiently well known and do not require more detailed description.

The support 2 itself has one end mounted so as to be able to pivot about an axis of rotation 7, and in addition has its other end mounted via a pressure sensor 8. If the surface is then pushed, the support 2 along with the surface 3 can pivot about the axis 7, and the pressure sensor 8 is used to sense whether sufficient pressure on the surface has been provided that is enough for the touch to be regarded as an active command input, which is the case only when there is indeed a certain minimum pressure. In principle, there is the possibility in this case, since the control device 6 can be used to determine most precisely the point at which the finger is pushed onto the surface 3, to ascertain the distance of this point from the axis 7 and, as a result, to define what pressure is required at this location in order for an input signal to be regarded as provided, in order to use the distance ascertainment in this manner to ensure that ultimately the trigger force, that is to say the force with which it is necessary to push the surface 3 in order to provide an active input command, is the same at every location over the area of the surface 3.

As described, the operating apparatus involves the haptic or tactile feedback signal being provided upon release of the pressure on the surface on the basis of a sensed change in the contact area of the finger 9 pushing the surface. This contact area can be ascertained by the control device 6 using a suitable piece of evaluation software that evaluates the measurement signals provided by the controller, which measurement signals are tapped off at the touch-sensitive surface via the four corner sensors, for example. In the case of a capacitive surface, discharge effects occur, as explained, wherein the discharge or the charge transfer varies with the contact area of the finger, that is to say the zone in which charge transfer is possible. If the user pushes the surface firmly, the finger is "pushed so as to widen", and a large finger contact area $A_1$ is obtained, as shown in dashes in FIG. 1. The control device 6 is then able, for example precisely at the time at which a sufficient pressure triggering the command input is sensed by the pressure sensor 8, to perform the area determination, that is to say to determine the area $A_1$. From that time on, the sensor signals are picked up continuously in order to ascertain the contact area continually by further evaluation of these sensor signals.

Figure 2:
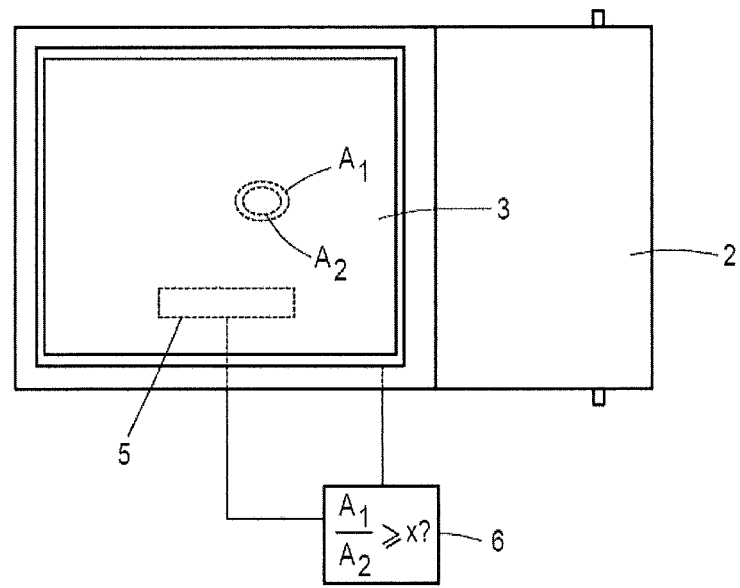
FIG. 2 shows a plan view of the operating apparatus from FIG. 1.

When the operator releases the finger from the surface 3, the fingerprint decreases, which is equivalent to a reduction in the contact area. This is measured continually, as described. The measured contact area is continuously related to the already known contact area $A_1$ and the ratio is checked to determine whether it is greater than or equal to a defined ratio value that describes a sufficient decrease in the contact area. The reducing contact area is shown in FIG. 2 by the stylized area $A_2$.

As soon as the control section ascertains that the ratio $A_1/A_2 \geq x$ (where x=predetermined ratio value), this is regarded as a triggering constraint for the "release" signal, that is to say the haptic feedback signal that needs to be provided upon release. The control device 6 then immediately actuates the actuator system 5 in order to provide the haptic vibration signal as a feedback signal. The operator feels this signal, since his finger continues to be in contact with the surface 3 even though he is about to lift it.

In a redundant manner with respect to the described nature of the sensing of the "release" process, the control device 6 also continually senses the pressure by the pressure sensor 8. The reason is that the lifting of the finger naturally also entails a reduction in the applied pressure sensed by the pressure sensor 8. This process may be somewhat delayed, however, on account of the sluggish mass of the operating apparatus 1, as a result of which the provision of the "release" signal exclusively in response to the pressure sensing can result in delayed and hence somewhat imprecise feedback signals. This is countered by virtue of the proposal indeed involving the area alteration being sensed as a triggering constraint, which can take place with a high level of precision and extremely quickly and hence promptly. Although the redundant check by the pressure signal is expedient, it should result in errors for the area sensing.

Even though the use of a touch-sensitive surface in the form of a capacitive touchscreen has been described above, it is naturally possible for this surface 3 also to be formed by a resistive touchscreen or an optical touchscreen. All types of touchscreen allow the touch-dependent signals sensed at the surface to be evaluated such that area sensing is possible and, on the basis of this, appropriate sensing of a relative area alteration that is the basis for determining the time at which the haptic "release" feedback signal is provided is possible.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. An operating apparatus comprising:
   a manually operable touch-sensitive surface to sense a finger-surface contact area of a finger on the touch-sensitive surface during a triggering operation;
   an actuator system associated with the touch-sensitive surface to provide a haptic feedback signal to the finger via the touch-sensitive surface;
   a compressive force sensor to sense a pressure provided to the touch-sensitive surface from the finger pushing on the touch-sensitive surface; and
   a control device:
   to trigger a command input when the compressive force sensor senses that the pressure provided to the touch-sensitive surface is at least equal to a minimum sufficient pressure;

to determine a first finger-surface contact area $A_1$ at a time at which the minimum sufficient pressure is sensed;

to continuously determine a second finger-surface contact area $A_2$ until a ratio $A_1/A_2 \geq x$, where x is a predetermined ratio value; and to identify release of pressure from the touch-sensitive surface when, and to trigger the haptic feedback signal upon, the ratio $A_1/A_2 \geq x$.

2. The operating apparatus as claimed in claim 1, wherein the touch-sensitive surface is a capacitive touchscreen or touchpad.

3. The operating apparatus as claimed in claim 1, wherein the touch-sensitive surface is a resistive touchscreen or touchpad.

4. The operating apparatus as claimed in claim 1, wherein when the ratio $A_1/A_2 \geq x$, a first trigger condition is produced, when the compressive force sensor senses that the pressure provided to the touch-sensitive surface has dropped to a release pressure below the minimum sufficient pressure, a second trigger condition is produced, and the haptic feedback signal is triggered as soon as one of the first and second trigger conditions is produced.

5. The operating apparatus as claimed in claim 1, further comprising a display device to display image representations that are visible though the touch-sensitive surface.

6. The operating apparatus as claimed in claim 5, wherein the image representation defines area regions that can serve as input panels on the touch-sensitive surface.

7. The operating apparatus as claimed in claim 1, wherein the actuating system comprises at least one of an electromagnet, a piezoactuator and an eccentric motor.

8. The operating apparatus as claimed in claim 1, wherein the haptic feedback signal triggered upon the ratio $A_1/A_2 \geq x$, is a release haptic feedback signal, and a push haptic feedback signal is triggered when the compressive force sensor senses that the pressure provided to the touch-sensitive surface is at least equal to the minimum sufficient pressure.

9. The operating apparatus as claimed in claim 1, wherein the touch-sensitive surface is mounted on a support having first and second opposing ends, the first end of the support is mounted to pivot about an axis of rotation, and the second end of the support is mounted via the compressive force sensor.

10. The operating apparatus as claimed in claim 9, wherein the control device identifies a contact point at which the finger contacts the touch-sensitive surface, the control device determines a distance of the contact point from the axis of rotation, and the minimum sufficient pressure is varied based on the distance of the contact point from the axis of rotation.

11. A method for operating an operating apparatus comprising a manually operable touch-sensitive surface, a sensing device to sense a finger-surface contact area of a finger on the touch-sensitive surface during a triggering operation, an actuator system associated with the touch-sensitive surface to provide a haptic feedback signal to the finger via the touch-sensitive surface, a compressive force sensor to sense a pressure provided to the touch-sensitive surface from the finger pushing on the touch-sensitive surface, and a control device that controls operation, the method comprising:

determining a first finger-surface contact area $A_1$ at a time at which the minimum sufficient pressure is sensed;

continuously determining a second finger-surface contact area $A_2$ until a ratio $A_1/A_2 \geq x$, where x is a predetermined ratio value; and identifying release of pressure from the touch-sensitive surface when, and triggering the haptic feedback signal upon, the ratio $A_1/A_2 \geq x$.

* * * * *